July 3, 1956 V. L. SMITHERS 2,753,277
ABSORBENT MATERIAL FOR FLORAL ARRANGEMENTS
Filed Nov. 3, 1953

INVENTOR.
VERNON L. SMITHERS
BY

ATTORNEYS

United States Patent Office 2,753,277
Patented July 3, 1956

2,753,277
ABSORBENT MATERIAL FOR FLORAL ARRANGEMENTS

Vernon L. Smithers, Akron, Ohio

Application November 3, 1953, Serial No. 390,031

5 Claims. (Cl. 117—138.8)

The present invention is directed to the production of a new and useful material especially adapted and intended to be used as a support for holding the stems of cut flowers and supplying them with water, either with or without any of the well-known agents for prolonging the life of cut flowers. Attempts have been made heretofore to provide various moisture-retaining substances into which the stems of cut flowers may be inserted and by which sufficient moisture will be supplied to the flowers to keep them fresh for a long period. Such materials have as an added advantage the fact that the water is retained by the material and does not spill; hence it is possible to ship flowers in vases or even to overturn a vase and not lose any water.

Prior materials for the purpose have disadvantages which it is the purpose of the present invention to overcome. Moss, natural sponge, absorbent cotton, and sponge rubber have been used for the purpose, but these materials do not retain sufficient water or do not retain the water as long as might be desirable. Neither do these materials have sufficient strength to support any but the most delicate flowers.

It has also been proposed to use urea-formaldehyde foam as a substitute for the earlier used materials. The use of that material, however, is objectionable because it is not naturally water-absorbent due to the fact that it is composed of a multitude of closed cells, the walls of which prevent the absorption of water. In order to render the material water-absorbent, it has heretofore been considered necessary to work or knead the material while submerged to rupture the cells before any appreciable amount of water can be absorbed and held by the foam. The working of the material is objectionable and further it tends to disintegrate the material, especially in the presence of water, so that it is not as well adapted for supporting the stems of flowers.

The object of the present invention is to provide a synthetic resinous foam which will absorb water without any kneading or working of the material, and which will absorb and retain many times its weight in water. The new material will not dry out as rapidly and has the added property that it is not detrimental to flowers, but will actually keep flowers from wilting many hours longer than other mediums.

The new material is much stronger than foams which have to be kneaded in order to absorb water and hence can support heavy flowers much better. Also it has been found that the new material is much less subject to abrasion by handling. One objection to the use of resin foams has been that the material of the foam will come off on the hands as a fine powder and the powder freed from the surface of the material will be carried by the air, which is objectionable to some people.

The invention may be practiced both with the material in block or brick form and also in shredded or lump form.

This application is a continuation in part of prior application Serial No. 329,458, filed January 2, 1953.

The following description of the process and product is given as the best and preferred modes of carrying out the invention in such detail as to enable one skilled in the art to practice the same, but it is to be understood that the invention is not limited to such details and may be altered or modified within the scope of the appended claims.

Figure 1:
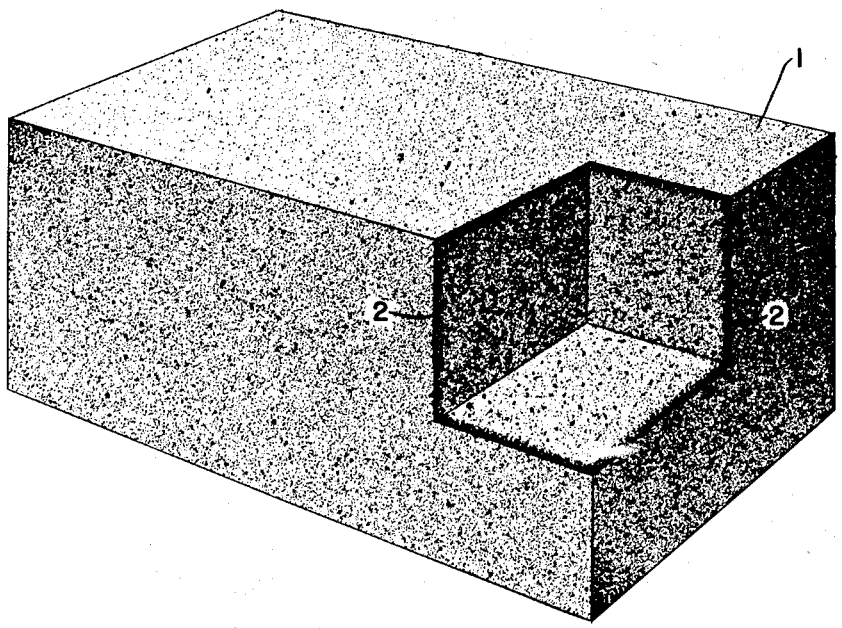
Fig. 1 is a view in perspective of the new floral supporting material, in block form, with a section cut out to show the structure thereof.

It will be understood that while the invention is described in its best known and preferred form in which the basic material employed for the floral supporting means is a phenol-formaldehyde foam, the invention in many of its aspects is not confined to that particular foam. Urea-formaldehyde foam is adaptable for the manufacture of floral supports by the use of the basic features of the invention. These foams are non-resilient and frangible, and penetrable to a degree which will permit the insertion of flower stems without deformation of the foam, and yet are strong enough to support the flowers.

However, as a phenol formaldehyde foam is preferred, the invention will be described as applied to that particular type of raw material, it being understood that having explained the preferred embodiment of my invention, those acquainted with the art to which it applies may adapt the invention to similar materials.

Phenol-formaldehyde resin in liquid form is supplied by the manufacturer thereof in graduated viscosities. A batch of any convenient size is measured out, it being preferable to secure the desired viscosity by mixing measured amounts of selected viscosities, depending upon the density of the foam which is to be made. The proportioning of the heavy and lighter resins is within the skill of one familiar with this art and need not be set forth in detail. To the batch is added a small amount of an agent which will impart some degree of softness and resilience to the finished product. For this purpose, it is preferable to use a water diluted material known as "Tween," which is sold by the Atlas Powder Company and is said to be polyoxyethylene sorbitan mono palmitate. Isopropyl ether or a mixture of ispropyl ether and "Tween" may be used. Other materials such as described in the United States Patent No. 2,446,429 may be employed.

While "Tween" and similar materials used in the process are well-known wetting agents, they are not used in the foam making procedure because of that property. Their purpose is to reduce the excessive brittleness of the foam and to impart a limited degree of softness and resilience, but wetting agents used at this point in the process lose all of their property as wetting agents during the subsequent generation of the foam.

Approximately 5% of Tween by weight is added to the resin batch, and then to the batch is added the foaming agent and hardener or catalyst. The foaming agent and hardener consist basically of sulphuric acid, isopropyl ether and phosphoric acid. The proportions of these materials are varied in accordance with the results desired, and as no invention is claimed for the materials and as the process up to this point is well known, further details are not necessary.

In previous methods of making the foam by the process set forth, it has been necessary to stir the foaming agent and catalyst very rapidly (about 5 seconds) because the reaction which causes the mass to foam is very fast. It has been found, however, that by reducing the amount of catalyst, by stirring very slowly, and by keeping the mixture cool, the reaction may be delayed for a minute or more, which gives a better distribution of the reagents through the mass of resin, resulting in a more uniform, and less brittle mass of foam.

To carry out the process, the resin mix is placed in a bottomless container which is lined with paper. This is set in a large pan and a paper lined collapsible mold is lowered over the pan and over the container, the mold having an opening which registers with the container. The mold telescopes over the pan so that it may rise as the foam is generated. A stirrer is then lowered into the resin and the foaming and hardening agent is added to the resin.

After the reagents have been thoroughly incorporated in the mass and before the actual foaming starts, the stirrer and the container are removed and a cover is placed over the opening in the mold. The foaming operation now takes place vigorously and the mold is raised by the foam, the paper linings forming a covering about the final block. After a few minutes, when the foaming reaction has ended, the mold is removed and the block of foam is placed in a ventilating chamber to remove any residual gases.

The block of foam may be of any suitable dimension but for economical reasons it is desirable to make it about 5 feet in each dimension. This large block is then cut into smaller blocks if the block type floral support is desired, or it may be cut into lumps or shredded if the shredded form is desired. Scraps and broken pieces may be worked into the shredded form.

It has been found that cut flowers are best preserved if the pH value of the medium in which the stems are inserted is kept at a point between 4 and 6. If the medium is neutral or alkaline, the flowers will wilt quickly, while if the pH value drops appreciably below 4, the stems will darken, fragile stems will soften and the flowers fall over.

To prevent the above results and to provide a mass of water-absorbent foam which will not only support the flowers and form a non-spillable source of water but also increase the life of the flowers, the acidity of phenolic foam is closely watched. While the optimum pH value is not less than 4 and not over 6, a slight variation above or below is not too objectionable. It is therefore stated that the adjusted pH value of the phenolic foam should be between the limits of 3.75 and 6.5.

In order to adjust and hold the pH value within the desirable limits, any mild acidic stabilizer may be used. I prefer to use sodium bicarbonate in such quantity as may be indicated by analysis of the final product, which is added just prior to the foaming operation.

The mass or block of foam formed in the manner described is a very poor water absorbent, in spite of the fact that usually about 45% of the mass is composed of open cells. It has been found that a block of foam weighing .06 lb. when immersed in water for 30 minutes absorbed only .19 lb. of water; immersed for 60 minutes absorbed only .21 lb. of water; and in six hours absorbed only .24 lb. of water. Absorption at this rate is wholly impractical and worthless for the service for which the invention is intended.

Kneading or working the foam while immersed in water does not improve the absorption materially and, in addition, as the foam is quite fragile, any such treatment will tend to disintegrate the foam.

It has been discovered that if the foam, after being produced in the manner described, is given an exterior coating of a wetting agent, the absorptive properties of the foam are increased to a degree which is astonishing.

For this purpose a block of the foam such as shown at 1 is sprayed with a wetting agent so that the agent dries in a thin layer 2 at the surface of the block. The layer of the wetting agent does not penetrate appreciably into the block but remains as a solid coating over the exterior of the block until the block is immersed in water.

When the block is immersed in water, the wetting agent is immediately dissolved in the water and is carried into the innermost portions of the block, not only into the broken cells but into all the closed cells as well, the agent breaking down all resistance to the penetration of water throughout the mass of foam.

The fact that the wetting agent is concentrated on the surface of the block and is carried into the block by the water, causes the concentration of the wetting agent to progressively diminish as the water is absorbed by the block. This action is very desirable because the concentrated wetting agent is not beneficial to the flowers, but as it is only in a very dilute solution in the interior of the block, any deleterious effects of the wetting agent are nullified.

An important advantage in coating the exterior of the foam with the wetting agent is that the dried layer of wetting agent will act as a binder over the exposed surface of the block, and this will prevent the objectionable dusting off of fine particles of the material in handling.

Figure 2:
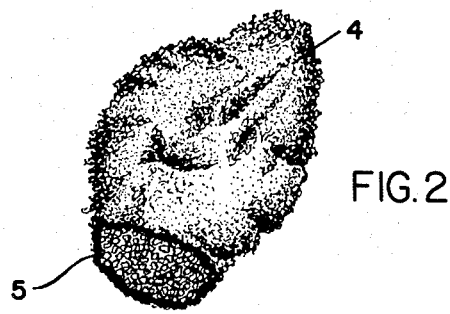
Fig. 2 is a view of a lump of the material in the shredded form, partly broken away.

In the case of the shredded form of the foamed material as shown in Fig. 2, an individual piece of the material is shown at 4. These pieces are sprayed by passing them through a tower in which are located a plurality of sprays which impinge upon the pieces as they fall through the tower. The coating of the dried wetting agent is indicated at 5.

Many types of wetting agents may be employed. Polyglycol ether is a good wetting agent and artificial soaps may also be employed. However, it is preferred to use what is known as "Igepal" manufactured by the Antara Products Co. and which is said by the manufacturers to be alkyl phenoxy polyoxyethylene ethanol. Igepal as it is received from the manufacturer is diluted with an equal part of water and is sprayed on the blocks or lumps. It is desirable to employ a rather light coating of the wetting agent. For example, on a standard block or brick of foam which measures 4.5" x 3.25" x 9.5" and which weighs .06 lb. approximately 4.4% of the weight of the block in Igepal gives excellent results. More than that is likely to be detrimental to the flowers and less than that will not give as complete penetration of water into the block. These factors may be readily determined by anyone skilled in the art and having knowledge of the invention imparted to him.

The amount of spray deposited on lumps of the foam as shown in Fig. 2 will be comparable to that for the standard size block.

The amount of water absorbed by the foam treated in the manner set forth is astonishing. For example, a standard size brick weighing .06 lb. when sprayed with Igepal in the concentration stated and to the extent of 4.4% of block weight, when immersed in water for 30 minutes, absorbed 4.2 lbs. of water or over 70 times its weight in water. This was close to saturation, as an indefinite immersion in water added only .1 lb.

It is preferred to use a liquid wetting agent and to spray it over the foam, but it is possible to use a wetting agent in powdered form and dust it over the block. This, however, will not reenforce the foam nor reduce the dusting-off effects nor will it give us uniform results as the liquid wetting agent sprayed over the blocks or lumps of foam.

In use of the material, if used in the block form of Fig. 1, the block or section cut from the block is held under water for several minutes or until fully saturated, whereupon the block is removed and surface water is allowed to drain off. The block may then be placed in a container and the stems of flowers inserted in the block. In spite of the fact that the block is heavily saturated with water, it will support the stems of most flowers such as roses, pansies and the like.

Use of the shredded material is recommended for filling vases or small containers which will not readily take a section of the block. In filling a vase the shredded material is first lightly packed and the water is poured over the container filled with the shredded material. Any excess or non-absorbed water is now poured off and the contents of the container are pressed lightly to increase the density of the mass to the degree that it will support the flowers.

It has been found that blocks of urea-formaldehyde foam treated with the wetting agents in the manner described will absorb much more water than if crushed in accordance with prior practices, and in addition the structure of the foam is not destroyed, so that it is better able to support flowers.

As indicated above, exact conformity with the details set forth herein is not necessary as changes and modifications may be made in procedures and materials without sacrificing the benefits of the invention.

What is claimed is:

1. As a new article of manufacture a water retentive mass of a foamed synthetic material selected from the group consisting of urea-formaldehyde and a phenolic condensation resin, suitable for supporting the stems of cut flowers, said mass being frangible when saturated with water so as to allow penetration of the stems of flowers without distortion of the mass and having a multiplicity of small bubble-like voids, and a layer of a wetting agent on the exterior of the mass adapted to carry water into the interior of the mass.

2. As a new article of manufacture a water retentive mass of a foamed synthetic material selected from the group consisting of urea-formaldehyde and a phenolic condensation resin, suitable for supporting the stems of cut flowers, said mass being frangible when saturated with water so as to allow penetration of the stems of flowers without distortion of the mass and having a multiplicity of small bubble-like voids, and a dried layer of a liquid wetting agent on the exterior of the mass adapted to carry water into the interior of the mass.

3. As a new article of manufacture a water retentive mass of a foamed synthetic material selected from the group consisting of urea-formaldehyde and a phenolic condensation resin, suitable for supporting the stems of cut flowers, said mass being frangible when saturated with water so as to allow penetration of the stems of flowers without distortion of the mass and having a multiplicity of small bubble-like voids, and a dried layer of a liquid wetting agent on the exterior of the mass adapted to carry water into the interior of the mass and into any closed voids.

4. An article of manufacture as described in claim 1 in which the foamed material has a pH value between 3.75 and 6.5.

5. An article of manufacture as described in claim 2 in which the foamed material has a pH value between 3.75 and 6.5.

References Cited in the file of this patent

UNITED STATES PATENTS

| | | |
|---|---|---|
| 2,037,049 | Sager | Apr. 14, 1936 |
| 2,056,796 | Mach et al. | Oct. 6, 1936 |
| 2,416,136 | Arlington | Feb. 18, 1947 |
| 2,478,879 | Ten Broeck | Aug. 9, 1949 |
| 2,618,901 | Braun | Nov. 25, 1952 |
| 2,664,366 | Wilson | Dec. 29, 1953 |